United States Patent Office 2,893,971
Patented July 7, 1959

2,893,971

BLEND OF BUTADIENE-STYRENE COPOLYMER AND BUTADIENE-UNSATURATED HETEROCYCLIC NITROGEN BASE COPOLYMER AND METHOD OF PRODUCING THE CURED PRODUCT THEREOF

Thomas J. Kennedy, Borger, Tex., and John L. Holst, Boulder, Colo., assignors to Phillips Petroleum Company, a corporation of Delaware No Drawing. Application May 13, 1957
Serial No. 658,522

8 Claims. (Cl. 260—45.5)

This invention relates to synthetic rubber. In a further aspect, this invention relates to a method of preparing synthetic rubber having increased modulus and to the products produced by the process.

A great many varieties of synthetic rubber are available to fabricators of rubber articles. A constant search is on to obtain articles of superior properties while decreasing the costs of components used therein. For one example, the accelerators used in curing synthetic rubber are expensive and attempts have been made to reduce the amounts used. However, when the amount is reduced, the properties of the product, particularly the modulus, are impaired. In the polymerization systems, attempts have been made to use cheaper emulsifying agents, such as tall oil soaps but it has been found that the polymers produced with such recipes have a slow curing rate.

We have discovered that the curing rate can be increased by incorporating in certain types of synthetic rubber a small amount of a polymer prepared from a copolymerizable heterocyclic nitrogen base. By so doing, the amount of acceleration can be reduced while still obtaining a good cure. Also, the cheap tall oil soap can be used in the polymerization recipe. A specific example of the composition covered by the present invention is a rubbery butadiene/styrene copolymer to which has been added a small amount of a butadiene/2-methyl-5-vinylpyridine copolymer. Amounts of the second copolymer as low as one percent bring about a very decided increase in modulus of the product when compared to the same copolymer without the added material.

The following are objects of the present invention.

An object of this invention is to provide new rubber compositions. A further object of this invention is to permit the use of cheap emulsifying agents while producing rubber of good quality. A further object of this invention is to permit reduction in accelerator level in rubber compounding recipes. A further object of this invention is to provide synthetic rubbery compositions having increased modulus.

Other objects and advantages of this invention will become apparent to one skilled in the art upon reading the accompanying disclosure.

As stated, our invention is based upon the discovery that a small amount of a rubbery polymer prepared by polymerizing a minor amount of a copolymerizable heterocyclic nitrogen base with a major amount of a conjugated diene, when added to a synthetic rubber, will provide a considerable increase in modulus of the product and will provide a product having good physical properties. The base rubbers in which this improvement is to be found are those prepared by polymerizing a major amount of a conjugated diolefin containing not over 6 carbon atoms and a minor amount of styrene, alpha-methyl styrene, vinyl toluene, acrylonitrile, methacrylonitrile, ethacrylonitrile, methyl acrylate, or ethyl acrylate. These rubbers are generally known as the butadiene/styrene type, the nitrile type, and the acrylate type. The dienes used in this polymerization include 1,3-butadiene, isoprene, piperylene, methyl pentadiene, and 2,3-dimethyl-1,3-butadiene. The copolymerizable heterocyclic nitrogen bases are those of the pyridine and quinoline series, including the isoquinolines, which contain a

group wherein R is hydrogen or methyl. Alkyl groups are also present on the nucleus although the total number of carbon atoms in all of the alkyl groups should not be greater than 12. Representative heterocyclic nitrogen compounds useful in the practice of this invention include: 2-vinylpyridine; 2-methyl-5-vinylpyridine; 5-methyl-2-vinylpyridine; 3-ethyl-5-vinylpyridine; 5-ethyl-2-vinylpyridine; 4-methyl-3-vinylpyridine; 2,3,4-trimethyl-5-vinylpyridine; 2,5-divinylpyridine; 2-isopropenylpyridine; 5-propyl-2-isopropenylpyridine; 2-octyl-5-vinylpyridine; 2-vinylquinoline; 8-ethyl-2-vinylquinoline; 4-hexyl-5-vinylquinoline; 1-vinyl-isoquinoline; 5-methyl-1-isopropenylisoquinoline; and the like. These copolymers which are added to the base rubber are prepared by polymerizing a minor amount of the substituted pyridine or quinoline with a major amount of a conjugated diene containing not over 6 carbon atoms, examples of which are the same as set forth above. Only a small amount of the rubbery nitrogen containing copolymer is used, the greatest effect being noted when up to 5 percent by weight is used based upon the weight of the base rubber. In general, 1 to 3 percent is sufficient to obtain the desired effect, this amount being generally used with the preferred nitrogen containing additives, i.e., those prepared by polymerizing 85 to 75 percent by weight of butadiene with 15 to 25 percent by weight of 2-methyl-5-vinylpyridine. In general, the amount of this nitrogen containing polymer to be added should be such that 0.001 to 0.3 weight percent of the final product is nitrogen.

Many methods of polymerization can be used in the production of the two copolymers which form the product of our invention but we prefer to use emulsion polymerization systems, many examples of which are shown in Synthetic Rubber, by Whitby.

The method of mixing of the two copolymers does not affect the product obtained to any great extent. We have mixed these polymers in latex form and on the mill. It is frequently more convenient in the process to mix the two materials in latex form where both materials are prepared in the same plant. However, mill mixing is of greater utility wherein a rubber product manufacturer wishes to obtain the advantage of our invention.

The following examples illustrate our invention.

EXAMPLE I

A butadiene/styrene copolymer was prepared by emulsion polymerization at 40° F. using the following recipe.

| | Parts by weight |
|---|---|
| Butadiene | 72.0 |
| Styrene | 28.0 |
| Water | 190.0 |
| Rosin soap, K salt | 4.5 |
| Potassium chloride | 0.40 |
| Tamol N [1] | 0.15 |
| Versene [2] | 0.01 |
| Sodium hydroxide | 0.04 |
| Tert-docecyl mercaptan | 0.5 |
| FeSO$_4$.7H$_2$O | 0.20 |
| Potassium pyrophosphate | 0.253 |
| Para-menthanehydroperoxide | 0.125 |
| Sodium dimethylditbiocarbamate | 0.100 |

[1] Sodium salt of a naphthalene sulfonic acid condensed with formaldehyde.
[2] Ethylene diamine tetracetic acid.

After 60% conversion, the rubber was coagulated and mixed on the mill with a butadiene/2-methyl-5-vinylpyridine rubber prepared by emulsion polymerization at 40° F. and taken to 60% conversion using the following recipe:

| | Parts by weight |
|---|---|
| Butadiene | 75 |
| Methylvinylpyridine | 25 |
| Water | 230 |
| K Fatty acid soap | 6.0 |
| Potassium chloride | 0.5 |
| Tamol N [1] | 0.3 |
| Versene [1] | 0.06 |
| Tert-docecyl mercaptan | 0.5 |
| Ferrous sulfate heptahydrate | 0.04 |
| Para-menthanehydroperoxide | 0.10 |
| Sodium formaldehyde sulfoxylate | 0.10 |

[1] See above recipe.

The 2-methyl-5-vinylpyridine rubber was used in amounts from 0.1 weight percent to 4.0 weight percent based upon the butadiene/styrene rubber. Following mixing, each mixture was compounded using the following recipe:

| | Parts by weight |
|---|---|
| Rubber | 100 |
| Black (EPC) | 40 |
| Zinc oxide | 5 |
| Sulfur | 2 |
| 2,2-dibenzothiazyl | 3 |
| Stearic acid | 1.5 |

Following compounding of the recipes, the specimens were cured for 25, 50, and 100 minutes at 292° F. and tested to determine modulus, tensile strength, and elongation. The results are shown in Table I.

*Table 1*

| Butadiene/ styrene copolymer, parts by weight | Butadiene/ 2-methyl-5-vinyl pyridine copolymer, parts by weight | Raw Mooney (ML-4) | Compounded Mooney (ML-4) | 300% Modulus | | | Tensile (p.s.i.) | | | Elongation (Percent) | | |
|---|---|---|---|---|---|---|---|---|---|---|---|---|
| | | | | 25 min. | 50 min. | 100 min. | 25 min. | 50 min. | 100 min. | 25 min. | 50 min. | 100 min. |
| 100 | 0 | 49.0 | 58.5 | 400 | 980 | 1,420 | ---- | 4,060 | ---- | ---- | 690 | ------ |
| 100 | 0.1 | ------ | 61.0 | 540 | 1,190 | 1,540 | 3,600 | 4,640 | 3,700 | 850 | 660 | 510 |
| 100 | 0.25 | ------ | 61.0 | 610 | 1,310 | 1,690 | 3,875 | 4,550 | 4,150 | 800 | 620 | 510 |
| 100 | 0.50 | ------ | 60.0 | 800 | 1,410 | 1,820 | 4,010 | 3,860 | 3,690 | 720 | 550 | 470 |
| 100 | 1.00 | ------ | 61.0 | 930 | 1,570 | 1,930 | 4,080 | 3,960 | 3,420 | 680 | 500 | 420 |
| 100 | 2.00 | ------ | 60.0 | 1,240 | 2,010 | 2,280 | 4,270 | 3,760 | 3,150 | 600 | 480 | 380 |
| 100 | 4.00 | ------ | 60.0 | 1,560 | 2,140 | 2,600 | 3,630 | 3,560 | 2,820 | 460 | 380 | 330 |
| 0 | 100 | ------ | 50.5 | 1,320 | 1,610 | 1,790 | ---- | 2,650 | ---- | ---- | 430 | ---- |

EXAMPLE II

Using the same butadiene/styrene copolymer, additional runs were made using a butadiene/2-methyl-5-vinylpyridine prepared by emulsion polymerization at 40° F. and taken to 90% conversion using the following recipe:

| | Parts by weight |
|---|---|
| Butadiene | 85 |
| 2-methyl-5-vinylpyridine | 15 |
| Water | 230 |
| K fatty acid soap | 6.0 |
| Potassium chloride | 0.5 |
| Tamol N [1] | 0.3 |
| Versene [1] | 0.06 |
| Tert-dodecyl mercaptan | Variable |
| Ferrous sulfate heptahydrate | 0.04 |
| Para-menthanehydroperoxide | 0.10 |
| Sodium formaldehyde sulfoxylate | 0.10 |

[1] See Example I.

To the latex of the butadiene/styrene copolymer, sufficient latex of the butadiene/2-methyl-5-vinylpyridine polymer was added to give 1.8 percent by weight of the butadiene/2-methyl-5-vinylpyridine rubber based upon the butadiene/styrene copolymer. The mixture of the latices was coagulated and the rubber compounded according to the recipe of Example I and cured at 292° F. for 25, 50, and 100 minutes. As in Example I, portions of this mixture were tested to determine the properties thereof, these properties being set forth in Table II.

Table II

| Butadiene/styrene copolymer, parts by weight | Butadiene/2-methyl-5-vinyl pyridine copolymer, parts by weight | Raw Mooney (ML-4) | Compounded Mooney (ML-4) | 300% Modulus | | | Tensile (p.s.i.) | | | Elongation (Percent) | | |
|---|---|---|---|---|---|---|---|---|---|---|---|---|
| | | | | 25 min. | 50 min. | 100 min. | 25 min. | 50 min. | 100 min. | 25 min. | 50 min. | 100 min. |
| 100 | 0 | 53.0 | 58.5 | 410 | 1,040 | 1,390 | 2,930 | 4,350 | 3,730 | 980 | 700 | 550 |
| 100 | 1.8 | 53.0 | 61.0 | 850 | 1,680 | 2,110 | 4,140 | 4,420 | 2,560 | 800 | 550 | 330 |
| 0 | 100 | ----- | 64.0 | 1,770 | 2,050 | 2,130 | ---- | 2,780 | ---- | ---- | 380 | ---- |

EXAMPLE III

The butadiene/2-methyl-5-vinylpyridine copolymer of Example I was mixed with the butadiene/styrene copolymer of Example I in an amount of 4 percent based on the butadiene/styrene copolymer. The compounding recipe of Example I was used except that the accelerator was omitted. After one hour at 292° F., no curing was apparent. Thus, the 2-methyl-5-vinylpyridine component, while giving a large increase in cure, does not function as a cure accelerator.

We claim:

1. A rubber composition comprising a rubbery copolymer prepared by polymerizing a major amount of a conjugated diene containing not over 6 carbon atoms and a minor amount of a monomer selected from the group consisting of styrene, alpha-methylstyrene, vinyltoluene, acrylonitrile, methacrylonitrile, ethylacrylonitrile, methyl acrylate, and ethyl acrylate; and a small quantity of a second polymer prepared by polymerizing a major amount of a conjugated diene containing not over 6 carbon atoms and a minor amount of a copolymerizable $$\text{CH}_2=\underset{|}{\overset{R}{C}}-$$

substituted heterocyclic nitrogen base of the pyridine and quinoline series where R is selected from the group consisting of hydrogen and methyl, the amount of said second polymer being sufficient to provide 0.001 to 0.3 weight percent nitrogen based upon the total weight of the polymers in the composition.

2. A rubber composition comprising a rubbery butadiene/styrene copolymer and a small quantity of a butadiene/2-methyl-5-vinylpyridine copolymer, the amount of said butadiene/2-methyl-5-vinylpyridine copolymer being sufficient to provide 0.001 to 0.3 weight percent nitrogen based upon the total weight of the polymers in the composition.

3. A rubber composition comprising a rubbery butadiene/styrene copolymer and a small amount not exceeding 5 percent by weight of a butadiene/2-methyl-5-vinylpyridine copolymer.

4. A molded and vulcanized rubber composition comprising 25 to 75 parts of carbon black per 100 parts of synthetic rubber, the synthetic rubber component being a rubbery butadiene/styrene copolymer and a small quantity of a butadiene/2-methyl-5-vinylpyridine copolymer, the amount of said butadiene/2-methyl-5-vinylpyridine copolymer being sufficient to provide 0.001 to 0.3 weight percent nitrogen based upon the total weight of the polymers in the composition.

5. A molded and vulcanized rubber composition comprising 25 to 75 parts of carbon black per 100 parts of synthetic rubber, the synthetic rubber component being a rubbery butadiene/styrene copolymer and a small quantity not exceeding 5 percent by weight of a butadiene/2-methyl-5-vinylpyridine copolymer.

6. The method of producing a cured rubbery copolymer of increased modulus, said rubbery copolymer prepared by polymerizing a major amount of a conjugated diene containing not over 6 carbon atoms and a minor amount of a monomer selected from the group consisting of styrene, alpha-methylstyrene, vinyltoluene, acrylonitrile, methylacrylonitrile, ethacrylonitrile, methyl acrylate, and ethyl acrylate, comprising adding a small quantity of a second polymer prepared by polymerizing a major amount of a conjugated diene containing not over 6 carbon atoms and a minor amount of a copolymerizable $$\text{CH}_2=\underset{|}{\overset{R}{C}}-$$

substituted heterocyclic nitrogen base of the pyridine and quinoline series where R is selected from the group hydrogen and methyl, and curing the resulting mixture, the amount of said second polymer being sufficient to provide 0.001 to 0.3 weight percent nitrogen based upon the total weight of the polymers in the composition.

7. The method of producing a cured rubbery butadiene/styrene copolymer of increased modulus which comprises mixing with said copolymer a small quantity of a rubbery butadiene/2-methyl-5-vinylpyridine copolymer and curing the resulting composition, the amount of said butadiene/2-methyl-5-vinylpyridine copolymer being sufficient to provide 0.001 to 0.3 weight percent nitrogen based upon the total weight of the polymers in the composition.

8. The method of producing a cured rubbery butadiene/styrene copolymer of increased modulus which comprises mixing with said copolymer a small quantity not exceeding 5 percent by weight of a rubbery butadiene/2-methyl-5-vinylpyridine copolymer and curing the resulting composition.

References Cited in the file of this patent

Whitby: "Synthetic Rubber," John Wiley & Sons Inc. (New York), 1954, pages 725–726.